(12) United States Patent
Roetheli et al.

(10) Patent No.: US 10,575,498 B2
(45) Date of Patent: Mar. 3, 2020

(54) PET CHEW TREAT HAVING DENTAL EFFICACY

(71) Applicant: Pet's Best Life, LLC, North Kansas City, MO (US)

(72) Inventors: Joseph Roetheli, Liberty, MO (US); Lon D. Lewis, Topeka, KS (US)

(73) Assignee: PET'S BEST LIFE, LLC, North Kansas City, MO (US)

( * ) Notice: Subject to any disclaimer, the term of this patent is extended or adjusted under 35 U.S.C. 154(b) by 112 days.

(21) Appl. No.: 14/718,377

(22) Filed: May 21, 2015

(65) Prior Publication Data

US 2015/0334993 A1 Nov. 26, 2015

Related U.S. Application Data

(60) Provisional application No. 62/001,310, filed on May 21, 2014.

(51) Int. Cl.
| | | |
|---|---|---|
| *A01K 15/02* | (2006.01) | |
| *A23K 40/25* | (2016.01) | |
| *A23K 40/20* | (2016.01) | |
| *A23K 50/42* | (2016.01) | |
| *A61D 5/00* | (2006.01) | |

(52) U.S. Cl.
CPC ........... *A01K 15/026* (2013.01); *A23K 40/20* (2016.05); *A23K 40/25* (2016.05); *A23K 50/42* (2016.05); *A61D 5/00* (2013.01); *A46B 2200/1086* (2013.01)

(58) Field of Classification Search
CPC ................ A01K 15/026; A01K 15/025; A46B 2200/1086

USPC .......................................................... 119/709
See application file for complete search history.

(56) References Cited

U.S. PATENT DOCUMENTS

| | | | |
|---|---|---|---|
| 45,899 | A | 6/1914 | Ward |
| 51,881 | A | 3/1918 | Evans |
| 1,899,511 | A | 2/1933 | Leaf |
| D110,860 | S | 8/1938 | Feldmann |
| D206,811 | S | 1/1967 | Ryan et al. |
| 3,879,564 | A | 4/1975 | Cocozzella |
| D235,248 | S | 6/1975 | Bennett |

(Continued)

FOREIGN PATENT DOCUMENTS

| | | |
|---|---|---|
| CA | 2304890 A1 * | 5/1999 |
| GB | 2332850 B | 11/2002 |

OTHER PUBLICATIONS

US 45,900 A, 06/1914, Ward (withdrawn)

(Continued)

*Primary Examiner* — Magdalena Topolski
(74) *Attorney, Agent, or Firm* — Stinson LLP (57) ABSTRACT

A chew treat for an animal comprising a first major side and an opposite second major side. The first and second major sides of the chew treat are separated by a shelf. The chew treat additionally includes a plurality of walls extending from the shelf on each of the first and second major sides, with the walls defining a plurality of pockets on each of the first and second major sides. The chew treat is designed to improve animal wellness due to its unique features, which are configured to deter gulping, floss and clean teeth, and provide a high surface area to volume ratio so as to aid in solubilizing and digesting the chew treat.

22 Claims, 6 Drawing Sheets

(56) References Cited

U.S. PATENT DOCUMENTS

| | | | |
|---|---|---|---|
| 3,992,010 | A | 11/1976 | Mattenson |
| 4,355,485 | A | 10/1982 | Frank |
| D279,538 | S | 7/1985 | Throm |
| 4,568,596 | A | 2/1986 | Johnson |
| 4,578,899 | A | 4/1986 | Katila et al. |
| D291,881 | S | 9/1987 | Koushiafes |
| 4,802,444 | A * | 2/1989 | Markham .............. A01K 13/00 |
| | | | 119/709 |
| 5,014,995 | A | 5/1991 | Woodward |
| D326,115 | S | 5/1992 | Franklin et al. |
| D334,420 | S | 3/1993 | Gladfelter et al. |
| 5,344,153 | A | 9/1994 | Watanabe |
| 5,406,745 | A * | 4/1995 | Lin .......................... A01G 9/028 |
| | | | 404/41 |
| 5,431,927 | A | 7/1995 | Hand et al. |
| D370,034 | S | 5/1996 | Kipfer |
| D376,837 | S | 12/1996 | Peddicord et al. |
| D392,466 | S | 3/1998 | Kendall et al. |
| D402,436 | S | 12/1998 | Cawley et al. |
| D404,830 | S | 1/1999 | Childs et al. |
| D413,835 | S | 9/1999 | Guarriello |
| 6,129,053 | A | 10/2000 | Markham et al. |
| D449,881 | S | 10/2001 | Mock, Sr. |
| 6,566,419 | B2 | 5/2003 | Denesuk |
| D489,162 | S | 5/2004 | Dings-Plooij |
| D526,885 | S | 8/2006 | Kelleghan |
| 7,082,894 | B2 | 8/2006 | Sherrill et al. |
| D555,034 | S | 11/2007 | Van de Wetering |
| 7,798,106 | B1 * | 9/2010 | Tsengas .............. A01K 15/026 |
| | | | 119/710 |
| D658,346 | S | 5/2012 | Proudhon |
| D658,941 | S | 5/2012 | Trussell |
| D661,747 | S | 6/2012 | Huet, Jr. et al. |
| D692,674 | S | 11/2013 | Clerici et al. |
| D713,890 | S | 9/2014 | Elwell |
| 8,875,662 | B2 * | 11/2014 | Angle .................. A01K 15/025 |
| | | | 119/707 |
| 9,016,485 | B1 | 4/2015 | Liu |
| D729,550 | S | 5/2015 | Williams et al. |
| D733,322 | S | 6/2015 | Walczak et al. |
| D748,240 | S | 1/2016 | Goode |
| 9,596,832 | B2 * | 3/2017 | Davison, III ........ A01K 15/026 |
| 9,655,704 | B2 * | 5/2017 | Beckman ................ A61D 5/00 |
| 2004/0166157 | A1 | 8/2004 | Thombre |
| 2011/0192854 | A1 | 8/2011 | Chen et al. |
| 2011/0290197 | A1 * | 12/2011 | Koo ..................... A01K 15/026 |
| | | | 119/710 |
| 2014/0373788 | A1 * | 12/2014 | Ragonetti ............ A01K 15/025 |
| | | | 119/51.01 |
| 2018/0243063 | A1 * | 8/2018 | Coopersmith ....... A01K 15/026 |

OTHER PUBLICATIONS

US 47,061 A, 03/1915, Ward (withdrawn)
Wells Waffle Makers, Mar. 25, 2013, http://www.dvorsons.com/wells/WaffleIrons.htm#eseries).*
Elegant Gift Gallery "Meant to Bee" Honey-Scented Honeycomb Soap, Oct. 13, 2011 Web. Mar. 18, 2015 <http://elegantgiftgallery.com/meant-to-bee-honey-scented-honeycomb-soap-available-personalized.html> (4 pages).
Shannon Marie, "Hard Candy," Forks Knives & Spades. Sep. 27, 2011. Web. Mar. 16, 2016. <http://forksknivesandspades.blogspot.com/2011/09/hard-candy.html> (12 pages).
International Search Report dated Sep. 8, 2015 in Corresponding PCT/US15/31919 (2 pages).
Three Dog Bakery "Woof Woof Waffles" 3DogBlog Published online Sep. 3, 2011; http://blog.threedog.con/3rd-day-recipes/three-dog-3rd-day-september (7 pages).
17 Apart, "Whoofles natural Dog Treats: Chincoteague Island", Published online Aug. 2, 2011; http://www.17apart.com/2011/08/whoofles-natural-dog-treats.html (2 pages).
Nordic Ware Amazon.com: Honeycomb Pull-Apart Dessert Pan: Novelty Cake Pans: Kitchen & Dining, published online on Sep. 13, 2012, retrieved from http://www.amazon.com/gp/product/B006DH4OWY/ref=as_li_qf_sp_asin_il_tl?ie=UTF8&camp=1789&creative=9325&creativeASIN=B006DH4OWY&linkCode=as2&tag=slimbodyprogr-20&linkId=PCPV5A5DNHGJJLPX (4 pages).
Smartpaw Honeycomb Big Bone Pet Chew Toy, published online on Feb. 23, 2014, retrieved from http://www.amazon.com/SmartPawHoneycombBigBoneChewToy/dp/B00GNDVR3W/ref=cm_cr_pr_product_top?ie=UTF8 (6 pages).

* cited by examiner

PET CHEW TREAT HAVING DENTAL EFFICACY

RELATED APPLICATION

This non-provisional patent application claims priority benefit to U.S. Provisional Patent Application Ser. No. 62/001,310, filed on May 21, 2014, and entitled "NOVEL PET CHEW TREAT HAVING DENTAL EFFICACY," the entire disclosure of which is incorporated by reference into this non-provisional patent application.

FIELD

Embodiments of the present invention are directed to edible pet chew treats. In more detail, embodiments of the present invention are directed to edible pet chew treats that improve the health and wellness of animals.

BACKGROUND

Many domesticated animals (i.e., pets), such as dogs and cats, suffer from poor oral health. To combat this problem, edible pet chew treats have been developed to help clean the animals' mouths. For instance, some currently-available pet chew treats are configured to remove plaque and tartar from an animal's teeth as the animal chews on the treat. However, most currently-available edible pet chew treats are hard, brittle, and have a cylindrical shape. As a result, when provided to an animal, such pets chew treats are prone to break into large, thick pieces, which the animal quickly swallows without adequate chewing. Furthermore, certain types of animals, such as dogs, are prone to quickly swallowing cylindrical-shaped products whole. By quickly swallowing the treats, the treats are not allowed to reside within the animal's mouth long enough to be effective at cleaning the animals' teeth. Additionally, large pieces can easily be gulped (i.e., swallowed without chewing) and can become lodged in the animal's throat, which can cause the animal to choke and even die, or which can otherwise cause damage to or obstruct the animal's digestive tract which can be quite serious. Furthermore, currently-available edible pet chew treats are often difficult for the animal to digest.

In more detail, currently-available pet chew treats function to remove plaque and tartar from an animal's teeth by way of the surface of the pet chew treats scraping on the animals' teeth as the animal chews the treats. In currently-available pet chew treat, the surface of the treat is relatively smooth, which reduces the effectiveness of the treat's ability to clean the teeth. Furthermore, a surface area to volume ratio of currently-available pet chew treats is low, such that a reduced amount of surface area is available for cleaning the animal's teeth. Such a low surface area to volume ratio also reduces the solubility of the treat, thereby reducing the ability of the animal to digest the treats. Furthermore still, entire pet chew treats or large chunks of such pet chew treats can obstruct an animal's airway and/or digestive tract, which causes potential health and wellness issues for the animal.

As such, what is needed is a pet chew treat with a texture that functions to improve oral health of animals, will be much less likely to become lodged in the animals' airway or digestive track, is efficiently digestible, and that promotes the overall health and well-being of the animal.

SUMMARY

Embodiments of the present invention include a chew treat for an animal comprising a first major side and an opposite second major side. The first and second major sides of the chew treat are separated by a shelf. The chew treat additionally includes a plurality of walls extending from the shelf on each of the first and second major sides, with the walls defining a plurality of pockets on each of the first and second major sides.

Embodiments of the present invention additionally include a method of manufacturing a chew treat for an animal. The method comprises the initial step of mixing ingredients that will form part of the chew treat. A next step includes placing the mixed ingredients into a mold form of an injection molding machine, wherein the mold form is configured to shape the mixed ingredients to include a first major side and an opposite second major side and a plurality of walls extending from each of the first and second major sides, with the walls defining a plurality of pockets. A final step includes baking the mixed ingredients within the mold form to obtain a finished chew treat.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWINGS

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
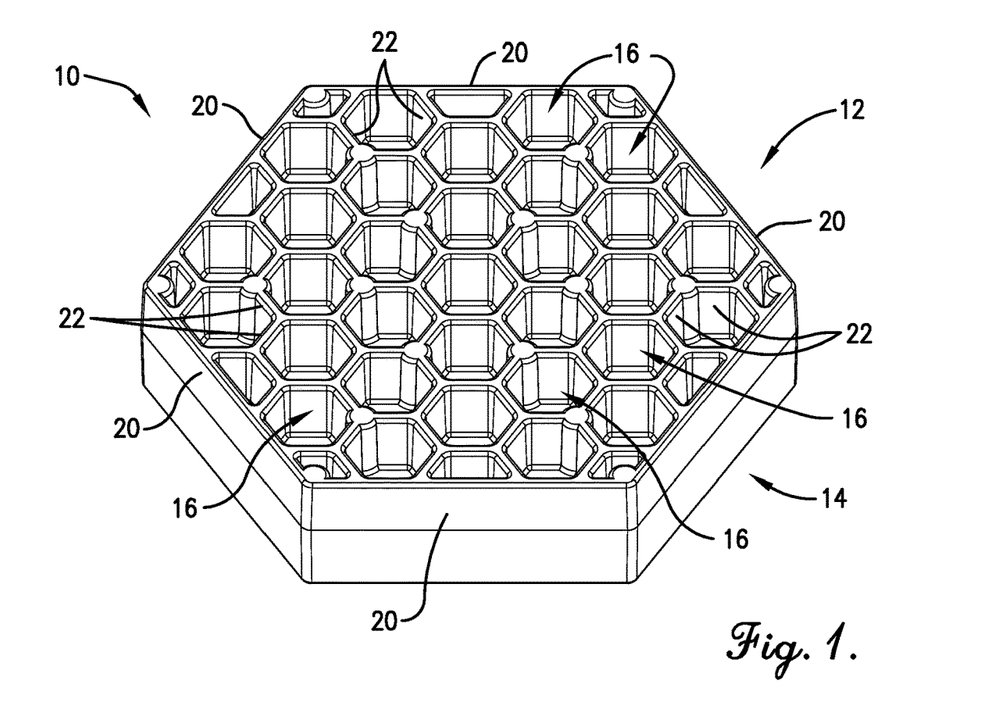
FIG. 1 is an isometric view of a first side of a chew treat according to embodiments of the present invention, with the chew treat having an overall hexagonal shape.
Figure 2:
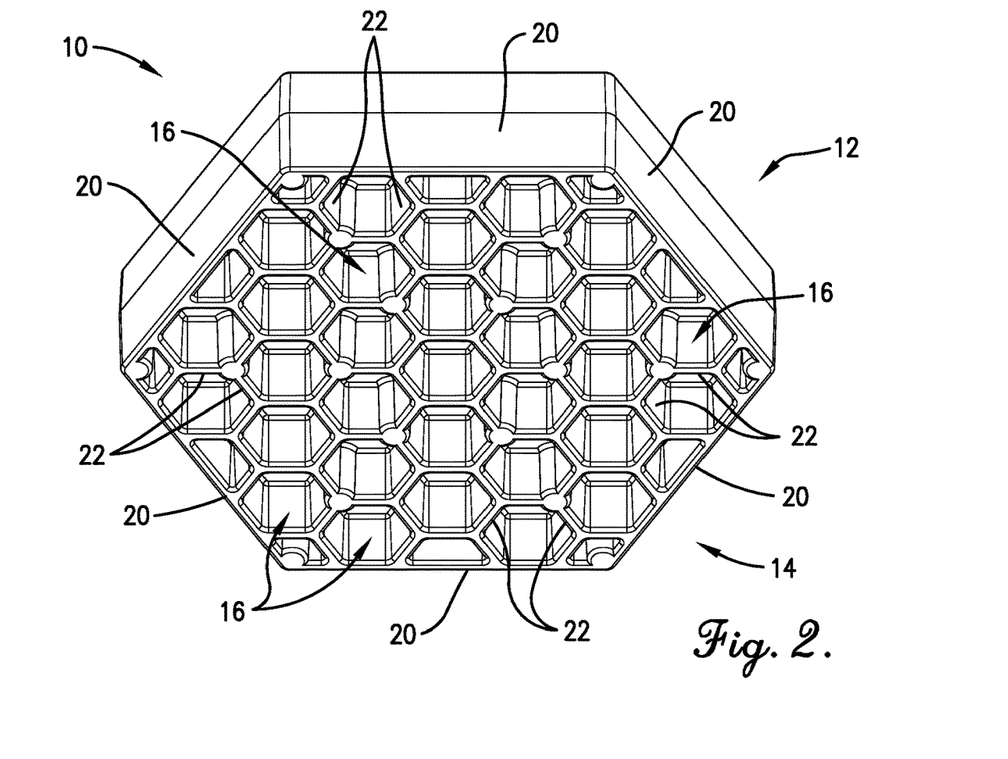
FIG. 2 is an isometric view of a second side of the chew treat from FIG. 1.

With initial reference to FIGS. 1-2, embodiments of the present invention includes an edible pet chew treat denoted by the numeral 10. The chew treat 10 of embodiments of the present invention may be provided to various types of animals, such as domesticated pets, including dogs and/or cats. As illustrated in FIGS. 1-4, the chew treat 10 may include a first major side 12 and an opposite second major side 14, with each of the major sides 12, 14 including a plurality of pockets 16 forming a part thereof. The pockets 16 may be at least partly defined by outer walls 20 of the chew treat 10 and/or by inner walls 22 of the chew treat 10. As perhaps best illustrated by FIG. 4, the first and second major sides 12, 14 may be separated by a shelf 24. As will be discussed in more detail below, the shelf 24 may present a floor surface for each of the pockets 16.

Figure 9:
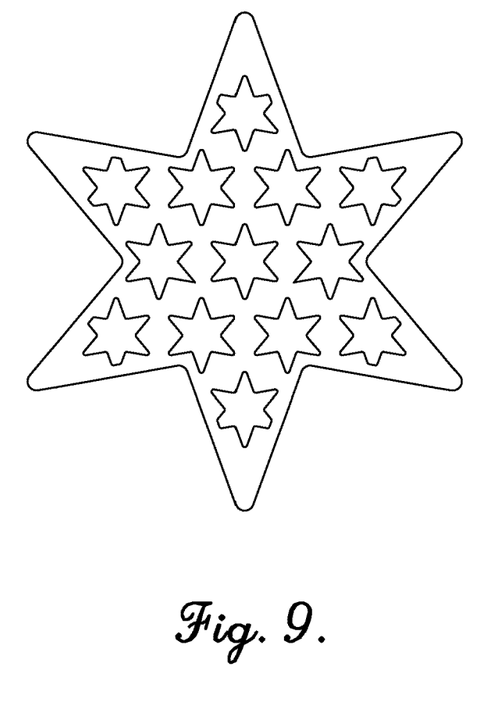
FIG. 9 is a first side plan view of a chew treat according to embodiments of the present invention, with the chew treat having an overall star shape.

Embodiments of the present invention may provide for the chew treat 10 to be formed in various geometrical shapes. For instance, as illustrated in FIGS. 1-4, the chew treat 10 may be formed as a hexagon, which includes six outer walls 20. As illustrated in FIGS. 5-8, the chew treat 10 may, alternatively, be formed in other geometric shapes, such as triangles (FIG. 6), rectangles and/or squares (FIG. 7), circles (FIG. 8), stars (FIG. 9) or the like. Furthermore, it should be understood that other geometric shapes may be used as well, such as zig-zag shaped, bone shaped, animal shaped, etc. Nevertheless, as will be described in more detail below, certain geometric shapes will enhance the ability of the chew treat 10 to have a high surface area to volume ratio, which may be preferable for certain embodiments of the present invention.

The chew treats 10 of embodiments of the present invention can be formed in a variety of sizes, depending on the animals to which the chew treats will be provided, and specifically, depending on the sizes of those animals. For instance, in cases in which the animals are dogs, the chew treats 10 can be formed in at least four different sizes, with each size being directed to a different size and/or class of dogs. For example, a small size chew treat 10 can be used with small-sized dogs (e.g., under 25 pounds (11.34 kg)), a regular size chew treat 10 can be used with regular-sized dogs (e.g., 25 to 60 pounds (11.34 to 27.22 kg)), a large size chew treat 10 can be used with large-sized dogs (e.g., 60 to 100 pounds (27.22 to 45.36 kg)), and a jumbo size chew treat 10 can be used with a jumbo-sized dog (e.g., over 100 pounds (45.36 kg)). Embodiments of the present invention may also include other sizes of chew treats 10 that can be used with other sizes and/or classes of animals, as may be required.

Figure 3:
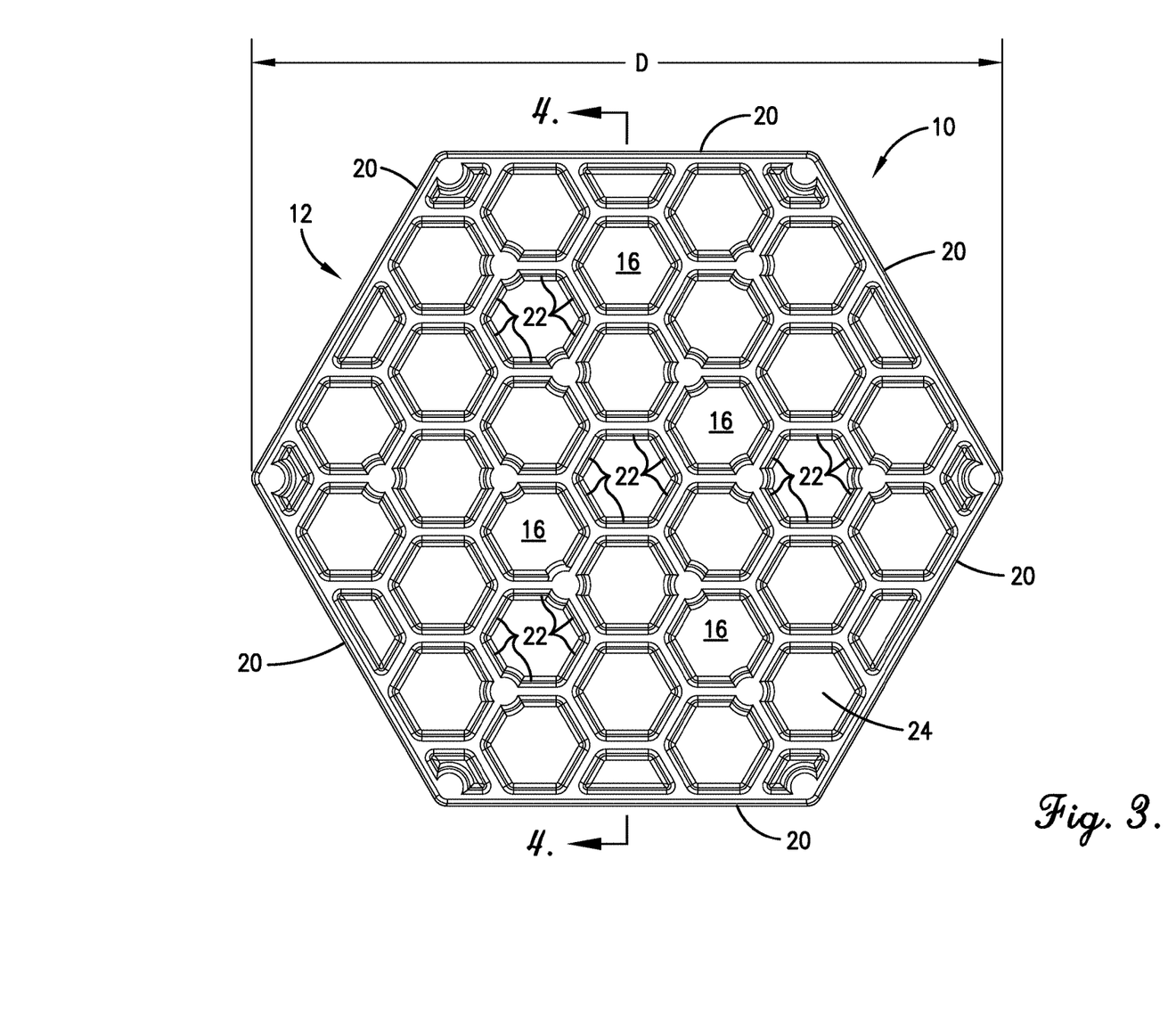
FIG. 3 is first side plan view of the chew treat from FIGS. 1-2.

With reference to FIG. 3, the chew treats 10 may have an overall diameter D (i.e., an overall width), which is based on the size of the chew treat 10 and/or on the particular sizes and/or classes of animals to which the chew treat 10 is to be given. Specifically, the particular chew treat 10 provided to an animal should have a diameter D that is wider than the animal's throat, so as to prevent the animal from gulping or swallowing the chew treat 10 whole. Furthermore, such a wide diameter D of the chew treat 10 will provide for extra material to be included within the chew treat 10, thereby requiring extra chew time for the animal to chew the chew treat 10 and increasing the dental cleaning efficacy. Given the previously-described size categories of chew treats 10, the overall diameter D of the chew treats 10 may be as follows: small size chew treats 10 may have diameters D between 1.750 to 0.500 inches (4.445 to 1.27 cm), between 1.500 to 0.600 inches (3.810 to 1.524 cm), or between 1.250 to 0.750 inches (3.175 to 1.905 cm); regular size chew treats 10 may have diameters D between 2.500 to 1.250 inches (6.350 to 3.175 cm), between 2.100 to 1.500 inches (5.334 to 3.810 cm), or between 1.900 to 1.600 inches (4.826 to 4.064 cm); large size chew treats 10 may have diameters D between 4.000 to 2.250 inches (10.160 to 5.715 cm), between 3.750 to 2.750 inches (9.525 to 6.985 cm), or between 3.400 to 2.500 inches (8.636 to 6.350 cm); and jumbo size chew treats 10 may have diameters D between 5.000 to 3.000 inches (12.700 to 7.620 cm), between 4.000 to 3.250 inches (10.160 to 8.255 cm), or between 3.750 to 3.500 inches (9.525 to 8.890 cm).

Figure 4:
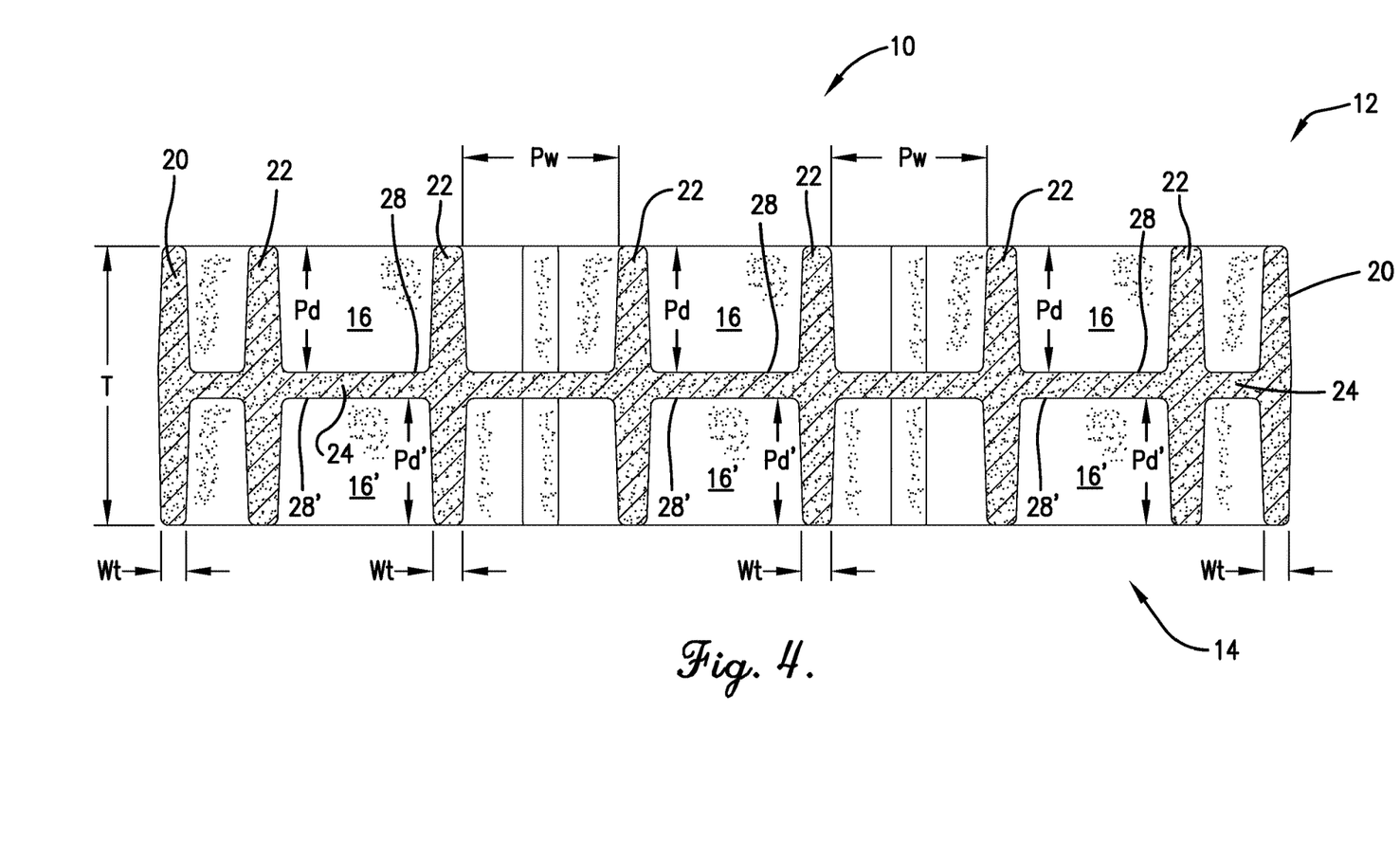
FIG. 4 is a cross section of the chew treat from FIGS. 1-3 taken along the line 4-4 from FIG. 3.

Similarly, with reference to FIG. 4, the chew treats 10 may have an overall thickness T that is based on the size of the chew treat 10 and/or on the particular sizes and/or classes of animals to which the chew treat 10 is to be given. With respect to the above-described size categories of chew treats 10, the overall thickness T the chew treats 10 may be as follows: small size chew treats 10 may have thicknesses T between 0.800 to 0.250 inches (2.032 to 0.635 cm), between 0.650 to 0.300 inches (1.651 to 0.762 cm), or between 0.550 to 0.350 inches (1.397 to 0.889 cm); regular size chew treats 10 may have thicknesses T between 1.050 to 0.350 inches (2.667 to 0.889 cm), between 0.900 to 0.500 inches (2.286 to 1.270 cm), or between 0.750 to 0.550 inches (1.905 to 1.397 cm); large size chew treats 10 may have thicknesses T between 1.200 to 0.400 inches (3.048 to 1.016 cm), between 1.000 to 0.600 inches (2.540 to 1.524 cm), or between 0.850 to 0.650 inches (2.159 to 1.651 cm); and jumbo size chew treats 10 may have thicknesses T between 1.500 to 0.500 inches (3.810 to 1.270 cm), between 1.250 to 0.600 inches (3.175 to 1.524 cm), or between 1.000 to 0.750 inches (2.540 to 1.905 cm).

Turning to the pockets 16, in some embodiments, the pockets 16 will have a shape that corresponds with the overall shape of the chew treat 10. The shape of the pockets 16 may generally be defined by the inner walls 22 and/or the outer walls 20 of the chew treat 10. As such, the inner walls 22 and/or outer walls 20 may be formed with shapes that correspond with the overall shape of the chew treat. For instance, as illustrated in FIGS. 1-3, embodiments in which the chew treat 10 is hexagonal, the pockets 16 may also be hexagonal. As such, the chew treat 10 may be formed as a honeycomb structure. Specifically, as shown in FIGS. 1-3, a given pocket 16 may be presented by six inner walls 22 and the floor surface presented by shelf 24, with the floor surface being described in more detail below. In some embodiments, as illustrated in FIGS. 1-3, each of the six inner walls 22 of a given pocket 16 may be generally parallel with a given outer wall 20 of the chew treat 10, such that both the overall shape of the chew treat 10 and the give pocket 16 are hexagonal. As previously described, the chew treat 10 may have other shapes, such as triangular, rectangular, circular, star-shaped, etc. In such embodiments, the pockets 16 may likewise be formed in such other shapes, i.e., triangular, rectangular, circular, star-shaped, etc. (See, e.g., FIGS. 5-9). In other embodiments, the pockets 16 may have shapes that are different from that of the overall shape of the chew treat 10. For instance, in some embodiments, the chew treat 10 may have a given geometric shape (e.g., hexagonal) and at least a portion of the pockets 16 may be rectangular, such as formed by parallel, straight inner walls 22.

Nevertheless, in certain embodiments, it may be preferable for the pockets 16 to have the same shape as the overall shape of the chew treat 10, as such embodiments may increase the overall strength of the chew treat 10 and/or may increase the surface area to volume ratio of the chew treat 10. For instance, a hexagonal-shaped chew treat 10 with a plurality of hexagonal-shaped pockets 16, as shown in FIGS. 1-4, may be preferable because wall thicknesses Wt (See FIG. 4) of the inner walls 22 and/or the outer walls 20 can be made generally uniform throughout the chew treat 10. As such, the surface area to volume ratio of the chew treat 10 can be maximized by reducing the amount of material required to be included within the chew treat 10 between the pockets 16. Furthermore, the honeycomb structure of the hexagonal-shaped pockets 16 can enhance the strength of the chew treat 10. Specifically, a chew treat 10 with a honeycomb structure may include high out-of-plane compression strengths and shear properties. Embodiments of the present invention provide for the strength of the chew treat 10 to be high even while the thicknesses of the inner walls 22 and/or outer walls 20 may be thin. Some of such properties can similarly be realized by using triangular or square shaped chew treats 10 and pockets 16.

In some embodiments, both the first and second sides 12, 14 of the chew treat 10 may comprise pockets 16. Certain embodiments may provide for the first and second sides 12, 14 to be generally symmetrical, such that the first and second sides 12, 14 are virtually identical. As such, and as illustrated by FIG. 4, a pocket 16 formed on the first side 12 of the chew treat may have a given depth Pd terminating at the shelf 24, and particularly at a floor surface 28 presented by the shelf 24 on the first side 12 of the chew treat 10. Similarly, a corresponding pocket 16' formed on the second side 14 of the chew treat 10 may have a given depth Pd' terminating at the shelf 24, and particularly at a floor surface 28' presented by the shelf 24 on the second side 14 of the chew treat 10. In some embodiments, as shown in FIG. 4, the pockets 16, 16' on each of the first and second sides 14, 16 may be aligned with each other. In other embodiments, the pockets 16 on the first side 12 may be misaligned with the pockets 16' on the second side 14. In addition, the number of pockets 16 formed on the first side 12 may, in some embodiments, be more or less than the number of pockets 16' formed on the second side 14. Furthermore, in some embodiments, the pockets 16 on the first side 12 may be formed with a different shape than the shape of the pockets 16' on the second side 14. In still further embodiments, the depth Pd of the pockets 16 of the first side 12 may be more or less than the depth Pd' of the pockets 16' on the second side 14.

In certain embodiments, the floor surfaces 28 and 28' are each formed by the shelf 24, such that the floor surfaces 28, 28' of the pockets 16, 16' share a common structure (i.e., shelf 24). In such embodiments, the pockets 16, 16' do not create openings or holes which would extend all of the way through the thickness T of the chew treats 10. In particular, in such embodiments, the combined depths of the pockets 16, 16' (i.e., Pd+Pd') is less than the thickness T of the chew treat 10. While such a configuration of the solid shelf 24 may add to the overall strength of the chew treat 10, other embodiments of the present invention may include at least one or more openings or holes extending through the shelf 24 between the pockets 16, 16'. When one or more openings or holes extend through the shelf 24, the shelf 24 will not be solid but may, nonetheless, be configured as a base from which the walls 20, 22 extend.

In some embodiments, the wall thicknesses Wt of the inner walls 22 and/or the outer walls 20 will be based on the size of the chew treat 10 and/or on the particular size and/or class of animal to which the chew treat 10 is to be given. The wall thickness Wt can provide for the overall strength of the chew treat 10, while simultaneously facilitating the ability of the chew treat 10 to effectively floss the animal's teeth by being appropriately sized for fitting between adjacent teeth in an animal's mouth. In addition, the wall thickness Wt allows for any sizeable parts swallowed by a "gulping" animal to dissolve more quickly, with greater solubility. The wall thickness Wt also allows for the nutrients to be digested more rapidly by the animal's stomach acids. This configuration also helps avoid esophageal and intestinal blockages. In particular, configuration of the wall thicknesses Wt provides a high surface area to volume ratio, which can facilitate solubility and digestion of the chew treat. Given the previously-described size categories of chew treats 10, the wall thicknesses Wt of the chew treats 10 may be as follows: small size chew treats 10 may have wall thicknesses Wt between 0.100 to 0.035 inches (0.254 to 0.089 cm), between 0.080 to 0.040 inches (0.203 to 0.102 cm), or between 0.070 to 0.050 inches (0.178 to 0.127 cm); regular size chew treats 10 may have wall thicknesses Wt between 0.150 to 0.050 inches (0.381 to 0.127 cm), between 0.090 to 0.060 inches (0.229 to 0.152 cm), or between 0.075 to 0.060 inches (0.191 to 0.152 cm); large size chew treats 10 may have wall thicknesses Wt between 0.250 to 0.040 inches (0.635 to 0.102 cm), between 0.100 to 0.050 inches (0.254 to 0.127 cm), or between 0.090 to 0.065 inches (0.229 to 0.165 cm); and jumbo size chew treats 10 may have wall thicknesses Wt between 0.350 to 0.065 inches (0.889 to 0.165 cm), between 0.180 to 0.070 inches (0.457 to 0.178 cm), or between 0.110 to 0.075 inches (0.279 to 0.191 cm). In certain embodiments, it should be understood that the wall thicknesses Wt for the inner walls 22 may be different than the wall thicknesses for the outer walls 20. For instance, in some embodiments, the inner walls 22 may have thicknesses Wt that are less than thicknesses Wt of the outer walls 20. In other embodiments, the inner walls 22 may have thicknesses Wt that are greater than thicknesses Wt of the outer walls 20.

Remaining with FIG. 4, a pocket width Pw of the pockets 16, either on the first or second side 12, 14, may be based on the size of the chew treat 10 and/or on the particular size and/or class of animal to which the chew treat 10 is to be given. The pocket width Pw can provide for an animal's tooth to be received within a pocket 16, so as to facilitate the ability of the chew treat 10 to clean the animal's teeth as the chew treat 10 is being consumed. Furthermore, the pocket width Pw provides a high surface area to volume ratio, which can facilitate solubility and digestion of the chew treat. Given the previously-described size categories of chew treats 10, the pocket width Pw of the chew treats 10 may be as follows: small size chew treats 10 may have pocket widths Pw between 0.160 to 0.275 inches (0.406 to 0.699 cm), between 0.180 to 0.250 inches (0.457 to 0.635 cm), or between 0.190 to 0.200 inches (0.483 to 0.508 cm); regular size chew treats 10 may have pocket widths Pw between 0.275 to 0.425 inches (0.699 to 1.080 cm), between 0.290 to 0.375 inches (0.737 to 0.953 cm), or between 0.300 to 0.350 inches (0.762 to 0.889 cm); large size chew treats 10 may have pocket widths Pw between 0.250 to 0.475 inches (0.635 to 1.207 cm), between 0.350 to 0.450 inches (0.889 to 1.143 cm), or between 0.375 to 0.440 inches (0.953 to 1.118 cm); and jumbo size chew treats 10 may have pocket widths Pw between 0.275 to 0.500 inches (0.699 to 1.270 cm), between 0.350 to 0.475 inches (0.889 to 1.207 cm), or between 0.375 to 0.460 inches (0.953 to 1.168 cm).

With continued reference to FIG. 4, the depth Pd of the pockets 16, either on the first or second side 12, 14, may be based on the size of the chew treat 10 and/or on the particular size and/or class of animal to which the chew treat 10 is to be given. The depth Pd of the pockets 16 can provide for an animal's tooth to be received within a pocket 16, so as to facilitate the ability of the chew treat 10 to clean the animal's teeth as the chew treat 10 is being consumed. In particular, the depth Pd allows for the walls 20, 22 to be sufficiently received within the space between an animal's teeth, such that the walls 20, 22 can floss between the animal's teeth. Furthermore, the depth Pd provides a high surface area to volume ratio, which can facilitate solubility and digestion of the chew treat 10. Given the previously-described size categories of chew treats 10, the depths Pd of the pockets 16 of the chew treats 10 may be as follows: small size chew treats 10 may have pocket depths Pd between 0.100 to 0.350 inches (0.254 to 0.889 cm), between 0.150 to 0.275 inches (0.381 to 0.699 cm), or between 0.200 to 0.250 inches (0.508 to 0.635 cm); regular size chew treats 10 may have pocket depths Pd between 0.125 to 0.450 inches (0.318 to 1.143 cm), between 0.150 to 0.375 inches (0.381 to 0.953 cm), or between 0.215 to 0.350 inches (0.546 to 0.889 cm); large size chew treats 10 may have pocket depths Pd between 0.225 to 0.550 inches (0.572 to 1.397 cm), between 0.250 to 0.500 inches (0.635 to 1.270 cm), or between 0.300 to 0.400 inches (0.762 to 1.041 cm); and jumbo size chew treats 10 may have pocket depths Pd between 0.100 to 0.550 inches (0.254 to 1.397 cm), between 0.275 to 0.550 inches (0.699 to 1.397 cm), or between 0.330 to 0.500 inches (0.838 to 1.270 cm).

Given the dimensions of the chew treats 10 described above, embodiments of the present invention provide for the chew treats 10 to have very high surface area to volume ratios. In particular, some embodiments provide for the surface area to volume ratio (as measured by "square inches: cubic inches") to be at least 12:1, at least 13:1, at least 14:1, at least 15:1, at least 16:1, at least 17:1, at least 18:1, at least 19:1, at least 20:1, at least 21:1, at least 22:1, at least 23:1, at least 24:1, or at least 25:1. When measured on a "square cm:cubic cm" basis, such ratios may be at least 4.7:1, at least 5.1:1, at least 5.5:1, at least 5.9:1, at least 6.3:1, at least 6.7:1, at least 7.1:1, at least 7.5:1, at least 7.9:1, at least 8.3:1, at least 8.7:1, at least 9.1:1, at least 9.4:1, or at least 9.8:1. For comparison, a flat-surfaced, cylindrical object having a diameter of 5 inches and a thickness of 1.5 inches would have a surface area of less than 2:1 (as measured by "square inches:cubic inches") or 0.8:1 (as measured on a "square cm:cubic cm").

Figure 5:
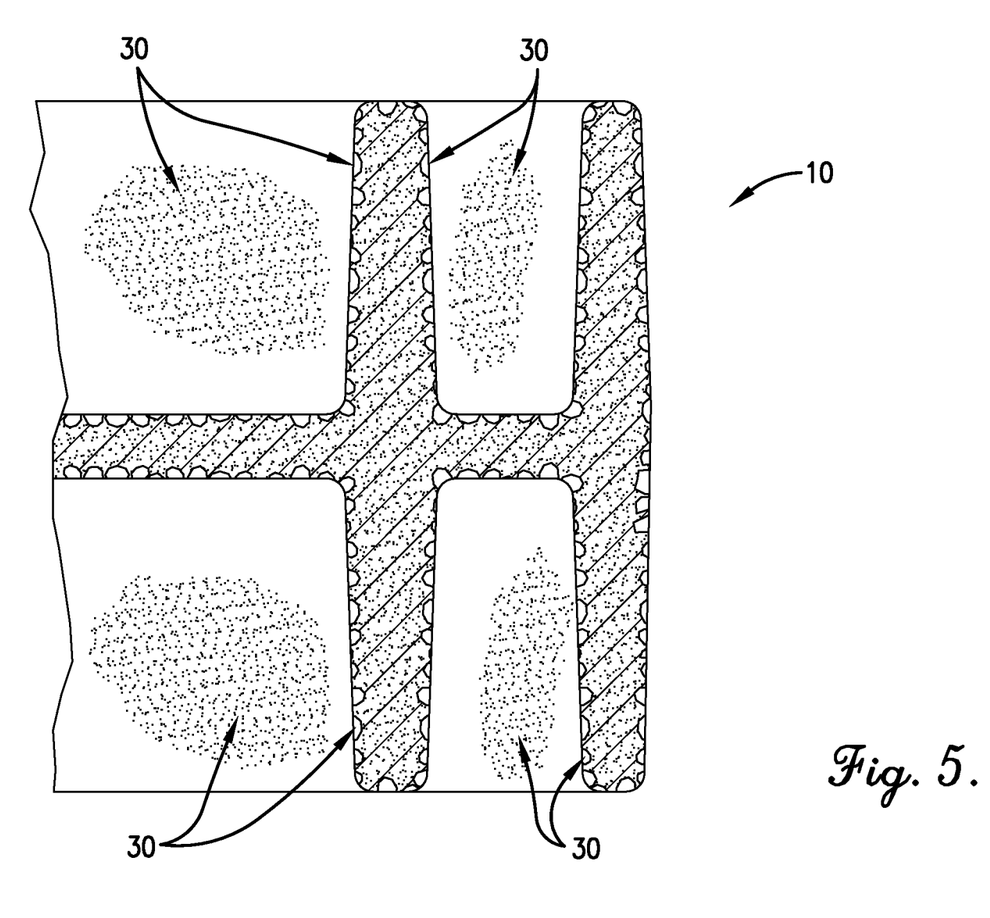
FIG. 5 is an enlarged partial view of the cross section of FIG. 4, particularly illustrating micro-holes on a surface of the chew treat.
Figure 6:
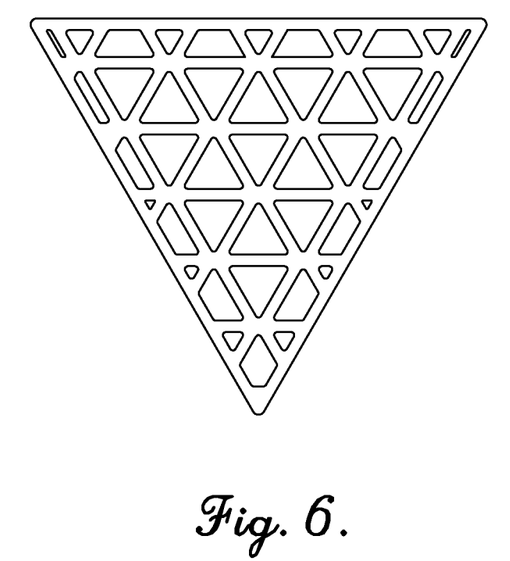
FIG. 6 is a first side plan view of a chew treat according to embodiments of the present invention, with the chew treat having an overall triangular shape.
Figure 7:
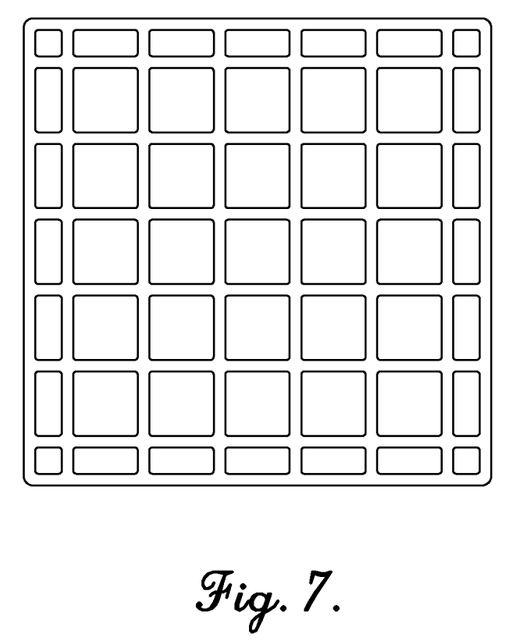
FIG. 7 is a first side plan view of a chew treat according to embodiments of the present invention, with the chew treat having an overall rectangular shape.
Figure 8:
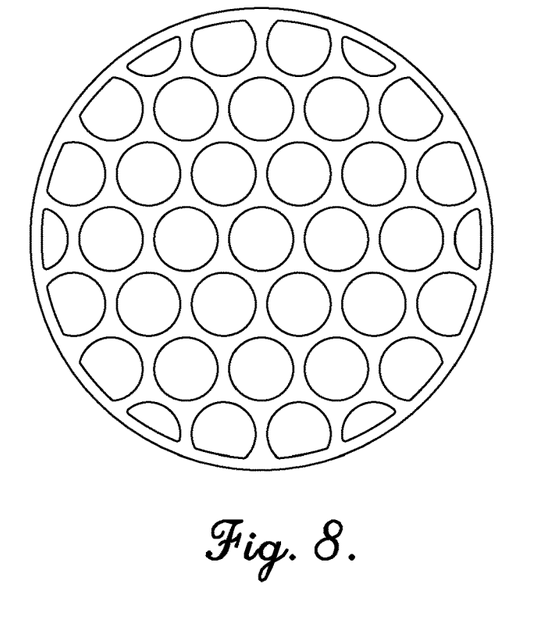
FIG. 8 is a first side plan view of a chew treat according to embodiments of the present invention, with the chew treat having an overall circular shape.

Furthermore, in some embodiments, a surface of the chew treat 10 may include micro-holes 30 on and/or through at least a portion of the surface of the chew treat 10, as is illustrated in FIG. 5. In some embodiments, the micro-holes 30 will form openings on the surface of the chew treat 10, with such micro-holes 30 having diameters of between 0.0100 to 0.0001 inches (0.27940 to 0.00245 mm), between 0.0050 to 0.0005 inches (0.12700 to 0.01270 mm), or between 0.0025 to 0.0007 inches (0.0635 to 0.01778 mm). Embodiments of the present invention provide for the micro-holes 30 to enhance the dental cleaning properties of the chew treat, by allowing the surface of the chew treat 10 to more effectively scrub against the animal's teeth as the chew treat 10 is being chewed.

Embodiments of the present invention provide for the chew treat 10 to be highly palatable and healthy to animals. In particular, the chew treats 10 may be formed with wholesome and nutritional ingredients that enhance the overall health of animals, while maintaining the palatability of the chew treats 10. Highly palatable chew treats 10 will promote the willingness of animals to chew the chew treats 10, which positively impact the cleaning and flossing of the teeth. In addition, the ingredients from which the chew treats 10 are formed may reduce halitosis and fecal odor of the animal. Furthermore, one or more of the ingredients included within the chew treat 10 can enhance the shine of the coat, or promote joint health, or enhance the health of the animal's eyes, heart, lung or immune system. In further embodiments, ingredients that provide flea and tick repellant functionality can also be included as ingredients of the chew treat 10.

Embodiments of the present invention include a manufacturing process for making a chew treat, such as the chew treats 10 illustrated in the figures. In some embodiments, the process will include stages for mixing, molding, and baking the chew treat 10. For instance, a first stage may include a mixing stage, in which the ingredients of the chew treat 10 are mixed and combined. In some embodiments, the mixing may be performed by an extrusion process in which the ingredients of the chew treats 10 are placed within an extrusion machine for mixing. In some embodiments, the ingredients that are provided to the extrusion machine for mixing may be in the form of a plurality of pellets. Thereafter, the mixed ingredients can be extruded from the extrusion machine to create an extruded product. However, it should be understood that, in some embodiments, the ingredients may be mixed by other processes, such that an extrusion machine is not required.

Next, a second stage of the process may include baking the mixed ingredients in an injection molding machine mold form to create the chew treat 10. The injection molding machine may include a mold form that has a shape corresponding to the shape of the chew treat 10 to be manufactured. For instance, the mold form may be configured to shape the mixed ingredients to include a first major side and an opposite second major side and a plurality of walls extending from each of the first and second major sides, with the walls defining a plurality of pockets. As such, the mixed ingredients can be introduced into the mold form of the injection molding machine for baking. After baking, the final chew treat 10 can be removed from the mold form for cooling.

In use, the chew treat 10 can be provided to an animal, such as a household pet (e.g., dog or cat), as a nutritional treat. Beneficially, the chew treat 10 also functions to enhance dental efficacy of the animal. For instance, the plurality of inner pockets 16 as defined by the inner walls 22 and/or outer walls 20 provide a strong and efficient chew treat 10 that functions to scrub and floss the animal's teeth as the animal chews the chew treat 10. Enhanced dental efficacy is further achieved with the pockets 16 formed on each of the first and second sides 12, 14 of the chew treat 10, as the animal's teeth will fit within the pockets 16 during chewing and will be scraped by the walls 20, 22 of the pockets, so as to clean the sides of the teeth. Furthermore, the walls 20, 22 are configured to floss between the animal's teeth. Specifically, the walls 20, 22 are sized so as to fit between adjacent teeth of an animal to thereby provide a flossing action between the teeth during chewing. As such, dental efficacy in animals can be enhanced without the need for dental cleaning under anesthesia.

In addition, the enhanced strength of the chew treat 10 of embodiments of the present invention is beneficial because it prolongs chewing time, which functions both to increase the dental cleaning properties of the chew treat 10, and also increases the enjoyment of the chew treat by the pet. Specifically, the chew treat 10, due to its strength and shape, is designed to reduce gulping whole or large chunks of the chew treats 10, which can lodge in the throat or cause issues in the digestive tract of animals. Furthermore, the enhanced strength of the chew treat 10 also reduces potential damage to the chew treat 10 during production, shipping and shelf handling.

Given the above, the chew treat 10 functions to clean, scrub, and floss the animal's teeth. The configuration of the inner and outer walls 22, 20 provide a high surface area to volume ratio for the chew treat 10, which functions to enhance dental efficacy and enhanced digestibility. Furthermore, dental efficacy can be enhanced via the micro holes 30 created through at least a portion of the chew treat's 10 surface. The micro-holes 30 also function to reduce the weight of the chew treat 10 and provide it additional strength characteristics.

In addition, the configuration of the inner and outer walls 22, 20 enhances solubility of the chew treat 10 to thereby speed digestion. Such solubility can be beneficial if the animal does not chew the chew treat 10 adequately. Furthermore, the combination of the wide overall diameter D of the chew treat 10 and the reduced thickness T of the inner and outer walls 22, 20 reduce the potential for esophageal and intestinal blockages of the chew treat 10.

EXAMPLE

In an example of one embodiment of the present invention, an innovative formula for a pet chew treat 10 with a three inch diameter D was injection molded according to the manufacturing process described above. The chew treat 10 was formed with a hexagonal shape (as illustrated in FIGS. 1-4) and included outer walls 20, inner walls 22, and a plurality of hexagon-shaped pockets 16 on each of its first and second sides 12, 14. In the present example, the density of the chew treat 10 was 0.578 ounces per cubic inch (0.001 grams per cubic millimeter), with such density being based on the mixture of the ingredients and the injection molded baking process. Additionally, the mass of the chew treat 10 was 1.666 ounces (47.225 grams), which provided a volume of 2.882 cubic inches (47.228 cubic cm).

The resulting surface area to volume ratio of the prepared chew treat 10 was found to be quite high. Specifically the surface area was found to be 53.947 square inches (348.045 square cm) and the volume was 2.882 cubic inches (47.228 cubic cm), which resulted in a surface area to volume ratio of about 18.7:1 when measured in inches (7.4:1 when measured in cm). To provide a comparison, a smooth cube having a volume of 2.882 would have a surface area to volume ratio of about 4.2:1 when measured in inches (1.7:1 when measured in cm).

Although this invention has been described with its preferred embodiment(s), it is noted that equivalents may be employed and substitutions made herein without departing from the scope of the invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

The invention claimed is:

1. A chew treat for cleaning a dog's teeth, said chew treat comprising:
   a first major side and an opposite second major side separated by a shelf;
   a plurality of walls extending outward from the shelf on each of said first and second major sides, wherein said walls define a plurality of pockets on each of said first and second major sides;
   wherein each of said pockets comprises an enclosed space surrounded by the walls that define the pocket, said pocket being configured to receive a tooth of a dog within the enclosed space as the dog chews said chew treat to clean the surfaces of the tooth and such that a portion of the walls defining the pocket is inserted between the tooth and one or more adjacent teeth of the dog so as to floss between the tooth and one or more adjacent teeth; and
   wherein said pockets have a maximum width that is less than an overall diameter of said chew treat and wherein said chew treat has a surface area to volume ratio of at least 12:1.

2. The chew treat of claim 1, wherein said pockets are configured in a hexagonal shape.

3. The chew treat of claim 1, wherein the chew treat is selected from the group consisting of a small treat having said overall diameter ranging from 0.5 to 1.750 inches, a regular treat having said overall diameter ranging from 1.25 to 2.5 inches, a large treat having said overall diameter ranging from 2.25 to 4.0 inches, and a jumbo treat having said overall diameter ranging from 3.0 to 5.0 inches.

4. The chew treat of claim 1, wherein said chew treat is selected from the group consisting of a small treat having said overall diameter ranging from 0.5 to 1.750 inches and a thickness of said walls ranging from 0.035 to 0.1 inches, a regular treat having said overall diameter ranging from 1.25 to 2.5 inches and said thickness of said walls ranging from 0.050 to 0.150 inches, a large treat having said overall diameter ranging from 2.25 to 4.0 inches and said thickness of said walls ranging from 0.040 to 0.250 inches and a jumbo treat having said overall diameter ranging from 3.0 to 5.0 inches and said thickness of said walls ranging from 0.065 to 0.350 inches.

5. The chew treat of claim 1, wherein said treat is selected from the group consisting of a small treat having said overall diameter ranging from 0.5 to 1.750 inches, a thickness of said walls ranging from 0.035 to 0.1 inches and a depth of said pockets ranging from 0.100 to 0.350 inches; a regular treat having said overall diameter ranging from 1.25 to 2.5 inches, said thickness of said walls ranging from 0.050 to 0.150 inches and said depth of said pockets ranging from 0.125 to 0.450 inches; a large treat having said overall diameter ranging from 2.25 to 4.0 inches, said thickness of said walls ranging from 0.040 to 0.250 inches and said depth of said pockets ranging from 0.225 to 0.550 inches; and a jumbo treat having said overall diameter ranging from 3.0 to 5.0 inches, said thickness of said walls ranging from 0.065 to 0.350 inches and said depth of said pockets ranging from 0.100 to 0.550 inches.

6. The chew treat of claim 1, wherein said treat is selected from the group consisting of a small treat having said overall diameter ranging from 0.750 to 1.250 inches, a regular treat having said overall diameter ranging from 1.6 to 1.9 inches, a large treat having said overall diameter ranging from 2.5 to 3.4 inches and a jumbo treat having said overall diameter ranging from 3.5 to 3.75 inches.

7. The chew treat of claim 1, wherein said treat is selected from the group consisting of a small treat having said overall diameter ranging from 0.750 to 1.250 inches and a thickness of said walls ranging from 0.050 to 0.070 inches; a regular treat having said overall diameter ranging from 1.6 to 1.9 inches and said thickness of said walls ranging from 0.060 to 0.075 inches; a large treat having said overall diameter ranging from 2.5 to 3.4 inches and said thickness of said walls ranging from 0.065 to 0.090 inches and a jumbo treat having said overall diameter ranging from 3.5 to 3.75 inches and said thickness of said walls ranging from 0.075 to 0.110 inches.

8. The chew treat of claim 1, wherein said treat is selected from the group consisting of a small treat having said overall diameter ranging from 0.750 to 1.250 inches, a thickness of said walls ranging from 0.050 to 0.070 inches and a depth of said pockets ranging from 0.200 to 0.250 inches; a regular treat having said overall diameter ranging from 1.6 to 1.9 inches, said thickness of said walls ranging from 0.060 to 0.075 inches and said depth of said pockets ranging from 0.215 to 0.350 inches; a large treat having said overall diameter ranging from 2.5 to 3.4 inches, said thickness of said walls ranging from 0.065 to 0.090 inches and said depth of said pockets ranging from 0.300 to 0.400 inches; and a jumbo treat having said overall diameter ranging from 3.5 to 3.75 inches, said thickness of said walls ranging from 0.075 to 0.110 inches and said depth of said pockets ranging from 0.330 to 0.500 inches.

9. The chew treat of claim 1, wherein at least some of said pockets on said first major side are generally aligned with at least some of said pockets on said second major side, and wherein said pockets are further defined by said shelf.

10. The chew treat of claim 9, wherein said shelf is solid, such that said chew treat does not include an opening extending entirely through a thickness of said chew treat.

11. The chew treat of claim 1, wherein a surface of said chew treat comprises a plurality of micro-holes formed thereon.

12. The chew treat of claim 1, wherein said pockets extend adjacent one another uniformly across the first and second major sides.

13. The chew treat of claim 1, wherein said pockets extend adjacent one another uniformly across the entirety of the first and second major sides.

14. The chew treat of claim 1, wherein said chew treat is formed by injection molding.

15. A chew treat for cleaning a dog's teeth, said chew treat comprising:
a first major side and an opposite second major side separated by a shelf;
a plurality of walls extending outwardly from the shelf on each of said first and second major sides, said walls defining a plurality of hexagonally shaped pockets extending on each of said first and second major sides;
wherein each of said pockets comprises an enclosed space surrounded by the walls that define the pocket, said pocket being configured to receive a tooth of a dog within the enclosed space as the dog chews said chew treat to clean the surfaces of the tooth and such that a portion of the walls defining the pocket is inserted between the tooth and one or more adjacent teeth of the dog so as to floss between the tooth and one or more adjacent teeth;
wherein the chew treat has an overall diameter selected from the group consisting of a small treat having said overall diameter ranging from 0.5 to 1.750 inches, a regular treat having said overall diameter ranging from 1.25 to 2.5 inches, a large treat having said overall diameter ranging from 2.25 to 4.0 inches, and a jumbo treat having said overall diameter ranging from 3.0 to 5.0 inches;
wherein said pockets have a width that is less than said overall diameter of said chew treat for each size of said chew treat; and
wherein said chew treat has a surface area to volume ratio of at least 12:1.

16. The chew treat of claim 15, wherein said chew treats are configured in a hexagonal shape.

17. The chew treat of claim 16, wherein said small treat has a thickness of said walls ranging from 0.035 to 0.1 inches, said regular treat has said thickness of said walls ranging from 0.050 to 0.150 inches, said large treat has said thickness of said walls ranging from 0.040 to 0.250 inches and said jumbo treat has said thickness of said walls ranging from 0.065 to 0.350 inches.

18. The chew treat of claim 16, wherein said small treat has a depth of said pockets ranging from 0.100 to 0.350 inches; said regular treat has said depth of said pockets ranging from 0.125 to 0.450 inches; said large treat has said depth of said pockets ranging from 0.225 to 0.550 inches; and said jumbo treat has said depth of said pockets ranging from 0.100 to 0.550 inches.

19. The chew treat of claim 16, wherein said small treat has said overall diameter ranging from 0.750 to 1.250 inches, said regular treat has said overall diameter ranging from 1.6 to 1.9 inches, said large treat has said overall diameter ranging from 2.5 to 3.4 inches and said jumbo treat has said overall diameter ranging from 3.5 to 3.75 inches.

20. The chew treat of claim 19, wherein said small treat has a thickness of said walls ranging from 0.050 to 0.070 inches, said regular treat has said thickness of said walls ranging from 0.060 to 0.075 inches, said large treat has said thickness of said walls ranging from 0.065 to 0.090 inches and said jumbo treat has said thickness of said walls ranging from 0.075 to 0.110 inches.

21. The chew treat of claim 20, wherein said small treat has a depth of said pockets ranging from 0.200 to 0.250 inches; said regular treat has said depth of said pockets ranging from 0.215 to 0.350 inches; said large treat has said depth of said pockets ranging from 0.300 to 0.400 inches; and said jumbo treat has said depth of said pockets ranging from 0.330 to 0.500 inches.

22. The chew treat of claim 21, wherein said chew treat is formed by injection molding.

* * * * *